United States Patent [19]

Shimaoka

[11] Patent Number: 4,583,141
[45] Date of Patent: Apr. 15, 1986

[54] FLEXIBLE MAGNETIC DISK DRIVING DEVICE

[75] Inventor: Motohiro Shimaoka, Furukawa, Japan

[73] Assignee: Alps Electric Co., Ltd., Japan

[21] Appl. No.: 430,977

[22] Filed: Sep. 30, 1982

[30] Foreign Application Priority Data

Oct. 30, 1981 [JP] Japan ................................. 56-174132

[51] Int. Cl.$^4$ ............................................. G11B 5/016
[52] U.S. Cl. ...................................................... 360/99
[58] Field of Search ........................... 360/97, 99, 133; 346/137; 369/261, 270

[56] References Cited

U.S. PATENT DOCUMENTS 4,040,106 8/1977 Medley .................................. 360/99
4,216,510 8/1980 Manzke et al. ....................... 360/99

Primary Examiner—John H. Wolff
Attorney, Agent, or Firm—Guy W. Shoup

[57] ABSTRACT

Disclosed is a flexible magnetic disk driving device wherein a transmission member which may be bent at an obtuse angle in the intermediate part thereof is pivotally mounted between an operation part and a hub mounting position of a pivoting arm pivotably mounted on a main body, and one end of the transmission member is engaged with a hub shaft while the other end is adapted to be able to contact with a stepped part of a front plate in order to allow a hub to be kept parallel to a spindle even when the operation part is in an open state. Thereby, there is little possibility that the magnetic disk may be damaged when loaded or unloaded and it can be used for a longer period of time, because the hub clamps the magnetic disk with the spindle while remaining substantially parallel to the spindle.

14 Claims, 5 Drawing Figures

FLEXIBLE MAGNETIC DISK DRIVING DEVICE

BACKGROUND OF THE INVENTION

Field of the Invention:

The present invention relates to a device for driving a flexible magnetic disk and more particularly to an improved structure for holding a magnetic disk in the position in the device.

In a typical flexible magnetic disk driving device, as shown in FIG. 1, a pivoting arm (4) is pivotably mounted to a portion of a main body (1) by means of a leaf spring (3), and a hub (7) is rotatably attached to an approximately central part of the pivoting arm (4) through a hub shaft (10). A spindle (11), which is driven to rotate by means of a driving motor (not shown), is disposed facing the hub (7) so that a magnetic disk (12) may be clamped by the spindle (11) and the hub (7) fitting within a central opening of the disk. An operation part (5) is formed on the free end of the pivoting arm (4), and this operation part serves to open or close an insertion port for the magnetic disk (12) by engaging with or disengaging from a front plate (2). In such a structure, the hub (7) attached to the pivoting arm (4) faces the spindle (11) obiquely when the disk is being inserted in the device, as shown in FIG. 1. In flexible magnetic disk driving devices, it is extremely important to hold and position the magnetic disk accurately by means of the spindle (11) and the hub (7). Since the pivoting arm (4) pivots about the holder with respect to the spindle (11), the hub (7) attached to the pivoting arm (4) moves obliquely with respect to the spindle (11) when holding and releasing the magnetic disk (12). Therefore, the conventional flexible magnetic disk driving devices have serious or significant problems in that the holding end of the hub (7) may damage the held portion of the magnetic disk (12), causing the life thereof to be shortened, and the magnetic disk (12) may not be reliably held by the spindle (11) and the hub (7), resulting in errors when data are written in or read out from the disk.

SUMMARY OF THE INVENTION

It is, therefore, an object of the present invention to provide a flexible magnetic disk driving device which has a low-profile and yet is capable of constantly and reliably holding a magnetic disk with minimal damage thereto by allowing the spindle and the hub to be positioned parallel to each other during engagement or dis-engagement from the disk, thereby to overcome the above-mentioned problems of conventional drives and to increase the service life of the magnetic disk.

DETAILED DESCRIPTION OF THE PREFERRED EMBODIMENT

Figure 1:
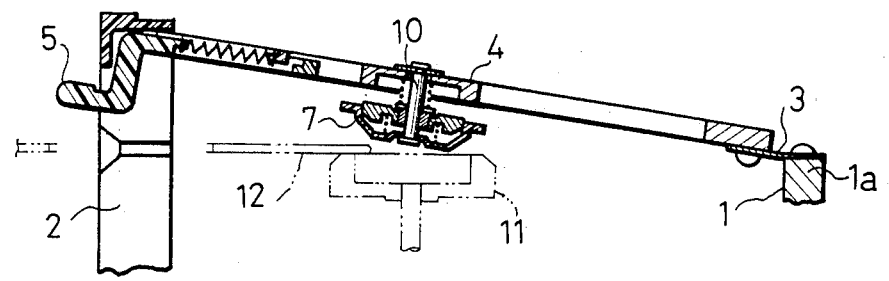
FIGS. 1 and 2 are side elevational views schematically illustrating a conventional flexible magnetic disk driving device various operating states with parts in section.
Figure 2:
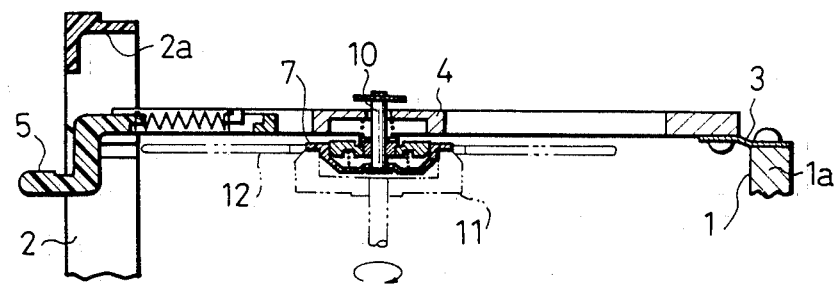

A preferred embodiment of the present invention will be described hereinunder with reference to the accompanying drawings. A main body (1) made of die-cast zinc or the like has a front plate (2) made of synthetic resin attached thereto. A leaf spring (3) made of a resilient material is held to a holder portion (1a) formed integrally with the main body (1). A pivoting arm (4) formed from die-cast zinc or the like is mounted to one end of the leaf spring (3). An operation part (5) is fitted to the free end portion of the pivoting arm (4) and is constantly urged toward the front plate (2) by means of a coiled spring (6). A hub (7) is formed from synthetic resin, and a pressing member (9) resiliently contacts the rear surface of the hub through a coiled spring (8a). Another coil spring (8) is placed between the pressing member (9) and the pivoting arm (4) so that the hub (7) is gently and resiliently urged downwards. The hub (7) is mounted on a hub shaft (10) and held rotatably by the pivoting arm (4). A spindle (11) can be rotated by means of a driving motor (not shown), and is rotatably supported by the bottom plate of the main body (1). A magnetic disk (12) can be held by the spindle (11) and the hub (7).

A metal transmission member (13) is pivotally supported on the pivoting arm (4). One end of the transmission member (13) is loosely engaged with the hub shaft (10) and held there by means of a washer (14), while the other end (13a) extends freely from the pivotal support at the pivoting arm (4). As shown clearly in FIG. 5, the free end (13a) of the transmission member may be formed of two parallel side arms extending along longitudinal side portions of the pivoting arm (14). As shown, the transmission member (13) may be bent in an intermediate part to form an obtuse angle facing upwardly. The transmission member (13) is in the state shown in FIG. 4 when no force is being applied to the free end thereof.

Figure 3:
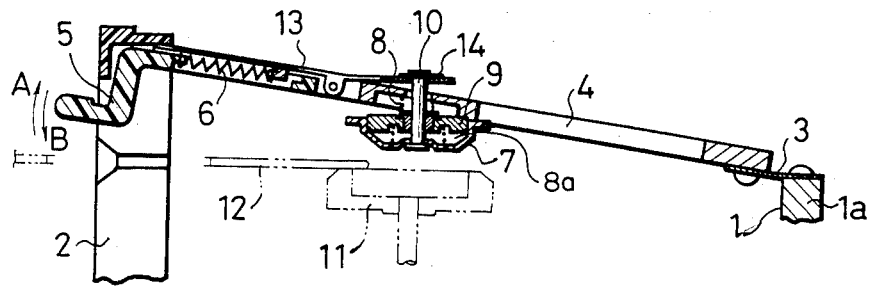
FIGS. 3 and 4 are side elevational views schematically illustrating a preferred embodiment of the present invention various states of operation with parts in section.
Figure 4:
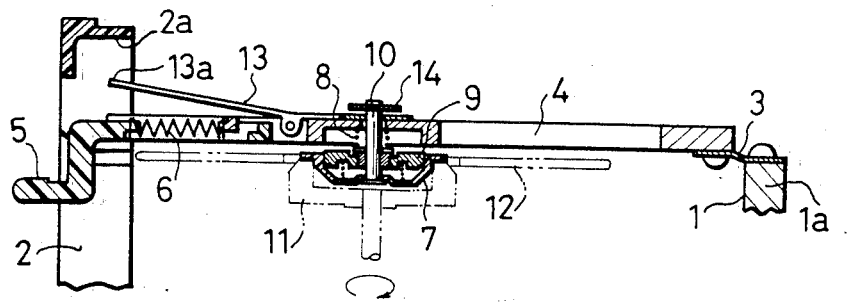

The operation for holding the flexible magnetic disk in a device according to the present invention will be described hereinunder. First, when the operation part (5) is rotated in the direction of an arrow A with the device in an inoperative state, the pivoting arm (4) is moved upwardly and the magnetic disk (12) can be unloaded. Consequently, the hub (7) separates from the spindle (11), and the free end (13a) of the transmission member (13) mounted on the pivoting arm (4) contacts with a stepped part (2a) of the front plate (2), causing the transmission member (13) to pivot about its pivotal connection with the pivoting arm (4). By this action, the other end of the transmission member (13) is lifted upwardly away from the pivoting arm (4), as shown in FIG. 3. In this state, the hub shaft (10) is lifted by the action of the transmission member (13), so that the hub (7) can be kept more parallel to the spindle (11), i.e. the axis of the hub is held generally perpendicular to the plane of the flexible disk. When a magnetic disk (12) is inserted from an opening (2b) in the front plate (2), the magnetic disk (12) is positioned at a given position by means of a guide groove. Next, when the operation part (5) is rotated in the direction of the arrow B, the pivoting arm (4) moves downward but the free end (13a) of the leaf spring (13) keeps contact with the stepped part (2a) of the front plate (2) for a while. Therefore, the hub (7) is kept substantially parallel to the spindle (11). When the operation part (5) is further rotated in the direction of the arrow B, the pivoting arm (4) moves downward further, causing the projecting portion of the hub (7) to enter into the central recess in the spindle (11). Upon this action, the magnetic disk (12) is held by the hub (7) and the spindle (11) while being positioned at a correct position by means of the periphery of the hub (7), as shown in FIG. 4. Consequently the hub is brought into engagement with the disk while maintaining its axis generally perpendicular to the plane of the flexible disk.

Figure 5:
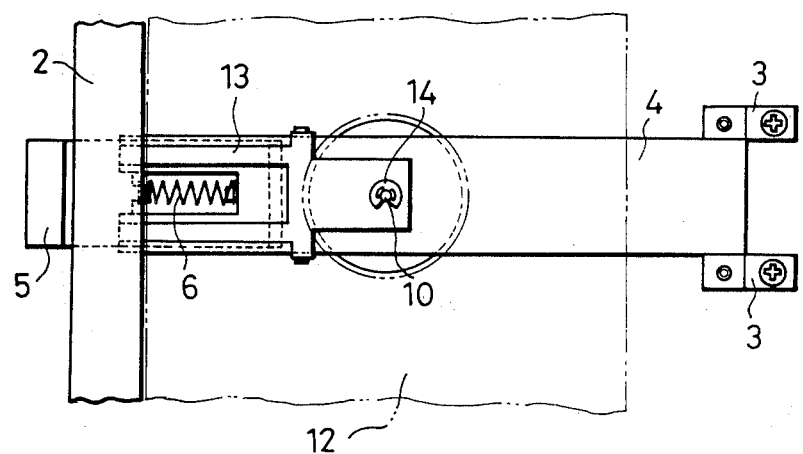
FIG. 5 is a plan view schematically illustrating portions of the preferred embodiment of the present invention.

In FIG. 5, a preferred form of the leaf spring 13 is shown having two arm portions extending parallel along opposite longitudinal sides toward the front plate 2 of the main disk drive body 1.

As described above, in the flexible magnetic disk driving device according to the present invention, a transmission member pivotally mounted one end portion one end portion engaged with the hub shaft while the other end portion is adapted to be able to contact with a part of the front plate so that the hub can be kept parallel in relation to the spindle and disk even when the operation part is in an open state. Thereby, there is reduced possibility that the magnetic disk may be damaged when loaded or unloaded, and its service life can be increased since the hub clamps the magnetic disk while remaining substantially parallel to the spindle.

It will be apparent to those skilled in the art that the foregoing detail description and accompanying drawings schematically illustrate the present invention, and that the new features herein disclosed may be embodied in various forms of construction without departing from the scope of the invention, which is intended to be defined by the appended claims.

What is claimed is:

1. A flexible magnetic disk driving device comprising a spindle supported for rotation within a main body, a pivoting arm mounted on said main body at one end and movable by actuation of an operating part at the other end, said pivoting arm having a hub mounted along a central portion thereof, said hub being adapted to face said spindle and being supported by said pivoting arm so as to be movable toward and away from said spindle by movement of said pivoting arm, means including a transmission member mounted between said operation part and the hub mounted on said pivoting arm, one end of said transmission member being engaged with a shaft of said hub while the other end being extended towards said operation part and bent upwardly for contacting a portion of a front plate of said disk driving device for keeping said hub generally parallel to said spindle during movement of said pivoting arm.

2. A flexible magnetic disk driving device as defined in claim 1, further including a pressing member urging said hub resiliently towards said spindle and respective springs disposed between said pivoting arm and said pressing member and between said pressing member and said hub.

3. A flexible magnetic disk driving device as defined in claim 2, wherein said springs are coiled springs, and said hub shaft is inserted through said coiled springs.

4. A flexible magnetic disc driving device as defined in claim 1, wherein said transmission member is bent at a pivoting support mounted on said pivoting arm.

5. A flexible magnetic disk driving device as defined in claim 1, including means for moving said operation part in the longitudinal direction of said pivoting arm.

6. In a device for rotating a magnetic disk adapted to receive and store information for retrieval, including a spindle and a hub movable towards the spindle for holding a magnetic disk therebetween, said hub being carried by an arm pivoted at one end portion thereof and movable pivotally between a first position in which said hub is spaced from said spindle to enable a disk to be placed therebetween and a second position bringing said hub towards said spindle for holding said disk therebetween, the improvement including means pivotal with movement of said arm for movably holding and maintaining the axis of said hub generally perpendicular to the plane of the disk as said arm is moved between its first and second positions.

7. A device according to claim 6, said device including a front plate having an opening adjacent the free end of said arm and said means including a transmission member carried by said arm and adapted to pivot about a position between said hub and said front plate, said hub including a central shaft engaged by said transmission member and said front plate including a portion engaging a forward portion of said transmission member when said arm is moved to said first position so as to pivot said transmission member to hold said shaft generally perpendicular to the plane of a disk inserted in said device.

8. A device according to claim 7, said transmission member being bent to form an obtuse angle extending from its pivotal connection to said arm.

9. A device according to claim 7, said transmission member including a central portion carrying said shaft and having two arm portions extending parallel along opposite longitudinal sides of said arm toward said front plate so as to engage respective portions thereof.

10. A device according to claim 9, said transmission member being bent to form an obtuse angle extending from its pivotal connection to said arm.

11. A device according to claim 7, further including means urging said hub resiliently away from said arm.

12. A device according to claim 11, said urging means including a pressing member located between said arm and said hub and respective springs disposed between said pressing member and said arm and said pressing member and said hub.

13. A device according to claim 12, said springs being respective coil springs.

14. A device according to claim 6, said device including a front plate having an opening adjacent the free end of said arm, and said free end of said arm including an operation part extending into said opening for manually pivoting said arm, and further including means connecting said operation part resiliently with said free end of said arm.

* * * * *